United States Patent
Lee et al.

(10) Patent No.: US 7,662,350 B2
(45) Date of Patent: Feb. 16, 2010

(54) FUEL REFORMING APPARATUS WITH FIRST PIPE ENDS CLOSED ONTO SECOND PIPE

(75) Inventors: Sung-Chul Lee, Suwon-si (KR);
Ju-Yong Kim, Suwon-si (KR);
Chan-Ho Lee, Suwon-si (KR);
Dong-Myung Suh, Suwon-si (KR);
Jin-Kwang Kim, Suwon-si (KR);
Jin-Goo Ahn, Suwon-si (KR);
Gorobinskiy Leonid, Suwon-si (KR)

(73) Assignee: Samsung SDI Co., Ltd., Suwon-si, Gyeonggi-do (KR)

( * ) Notice: Subject to any disclaimer, the term of this patent is extended or adjusted under 35 U.S.C. 154(b) by 456 days.

(21) Appl. No.: 11/527,588

(22) Filed: Sep. 27, 2006

(65) Prior Publication Data

US 2007/0071663 A1     Mar. 29, 2007

(30) Foreign Application Priority Data

Sep. 27, 2005 (KR) ............... 10-2005-0089817
Oct. 19, 2005 (KR) ............... 10-2005-0098516

(51) Int. Cl.
*F28D 21/00* (2006.01)
(52) U.S. Cl. ............... 422/202; 48/61; 48/102 A
(58) Field of Classification Search ......... 422/202–205; 48/102 A
See application file for complete search history.

(56) References Cited

U.S. PATENT DOCUMENTS 5,032,365 A    7/1991  Aono et al.
6,527,980 B1*  3/2003  Roden et al. ............... 252/373
2002/0015670 A1*  2/2002  Shah et al. ................ 422/198
2003/0054213 A1   3/2003  Ishikawa
2003/0159354 A1*  8/2003  Edlund et al. ............ 48/127.9
2003/0192251 A1  10/2003  Edlund et al.
2004/0047800 A1*  3/2004  Sennoun et al. ........... 423/652
2004/0126288 A1   7/2004  Fuju et al.
2005/0287401 A1* 12/2005  Kim et al. ................. 429/12

(Continued)

FOREIGN PATENT DOCUMENTS

CN            1133570       10/1996

(Continued)

OTHER PUBLICATIONS

European Search Report corresponding to European Patent Application No. 06121363.3, issued on Jun. 25, 2007.

(Continued)

*Primary Examiner*—Jennifer K Michener
*Assistant Examiner*—Imran Akram
(74) *Attorney, Agent, or Firm*—Robert E. Bushnell, Esq.

(57) ABSTRACT

A fuel reforming apparatus in constructed with a main body including a first pipe and a second pipe disposed in the first pipe and a heat source installed in the second pipe and adapted to generate thermal energy in the second pipe. A reforming reaction unit is formed by filling a reforming catalyst in a space defined between the first and second pipes and is adapted to generate a reformed gas containing hydrogen through a reforming reaction of the fuel. A housing encloses the main body and allows a combustion gas generated from the heat source to flow along an outer circumference of the reforming reaction unit.

19 Claims, 8 Drawing Sheets

U.S. PATENT DOCUMENTS

2006/0014061 A1* 1/2006 Kim et al. ................... 429/19

FOREIGN PATENT DOCUMENTS

| EP | 1 538 126 | 6/2005 |
| --- | --- | --- |
| EP | 1 619 166 | 1/2006 |
| JP | 06-048701 | 2/1994 |
| JP | 08-301602 | 11/1996 |
| JP | 10-194702 | 7/1998 |
| JP | 2004-059340 | 2/2004 |
| JP | 2004-171989 | 6/2004 |
| JP | 2004-288434 | 10/2004 |
| WO | WO 00/22690 | 4/2000 |
| WO | 00/63114 | 10/2000 |
| WO | WO 2005/000737 | 1/2005 |
| WO | WO 2005/077823 | 8/2005 |
| WO | WO 2005/084771 | 9/2005 |

OTHER PUBLICATIONS

Request for Entry of the Accompanying Office Action for Japanese Office action (non-English document).

Office action form Japanese Patent Office issued in Applicant's corresponding Japanese Patent Application No. 2006-259480 dated Nov. 10, 2009.

* cited by examiner

FUEL REFORMING APPARATUS WITH FIRST PIPE ENDS CLOSED ONTO SECOND PIPE

CLAIM OF PRIORITY

This application makes reference to, incorporates the same herein, and claims all benefits accruing under 35 U.S.C. §119 from an application earlier filed in the Korean Intellectual Property Office on 27 Sep. 2005 and 19 Oct. 2005 and there duly assigned Ser. Nos. 10-2005-0089817 and 10-2005-0098516, respectively.

BACKGROUND OF THE INVENTION

1. Field of the Invention

The present invention relates to a fuel reforming apparatus for a fuel cell system.

2. Description of Related Art

As is well known, a fuel cell is a system for generating electric energy using a fuel.

In the fuel cell, a polymer electrolyte membrane fuel cell has an excellent output characteristic, a low operating temperature, and fast starting and response characteristics. Therefore, the polymer electrolyte fuel cell advantageously has a wide range of applications including a mobile power source for vehicles, a distributed power source for home or buildings, and a small-sized power source for electronic apparatuses.

The fuel cell system employing the polymer electrolyte membrane fuel cell is constructed with a fuel cell main body (hereinafter, referred to as "stack"), a fuel reformer which reforms the fuel to generate a reformed gas containing hydrogen and supplies the reformed gas to the fuel cell main body, and an oxidizing gas supply unit which supplies an oxidizing gas to the stack.

Therefore, the polymer electrolyte membrane fuel cell system generates electric energy through an electrochemical reaction between the reformed gas and oxidizing gas that are supplied to the stack.

The fuel reformer may be constructed with a heat source that generates thermal energy by direct combustion of the fuel and a reforming reaction unit that generates the reformed gas through a reforming reaction of the fuel using the thermal energy.

In the contemporary fuel reformer, a relatively high temperature combustion gas, which is generated while the fuel is burned in the heat source, is exhausted as it is. This causes the loss of the heat energy of the combustion gas and thus increased the startup time. As a result, the thermal efficiency and performance efficiency of the system are deteriorated.

In addition, since the high temperature combustion gas exhausted through an outlet of the heat source contacts locally a portion of the housing of the fuel reformer, which corresponds to the outlet of the heat source, the housing may be damaged or the thermal energy of the combustion gas may be discharged to an external space through the local portion of the housing, thereby causing the thermal insulation performance to deteriorate.

As described above, in the contemporary fuel reformer, the thermal energy generated from the heat source is discharged through the local portion of the housing and thus the startup time increases. This causes a deterioration of thermal efficiency and performance efficiency of the fuel system.

SUMMARY OF THE INVENTION

It is therefore an object of the present invention to provide an improved fuel reforming apparatus.

It is another object of the present invention to provide a fuel reforming apparatus that is configured to additionally supply thermal energy of the combustion gas to a reforming reaction unit.

It is still another object of the present invention to provide a fuel reforming apparatus that is configured to improve a thermal insulation performance for thermal energy generated from a heat source.

In an exemplary embodiment of the present invention, a fuel reforming apparatus is constructed with a main body including a first pipe and a second pipe disposed inside the first pipe, a heat source installed in the second pipe and adapted to generate thermal energy in the second pipe, a reforming reaction unit formed by filling a reforming catalyst in a space defined between the first and second pipes and adapted to generate a reformed gas containing hydrogen through a reforming reaction of the fuel, and a housing enclosing the main body and allowing a combustion gas generated from the heat source to flow along an outer circumference of the reforming reaction unit.

A flow path along which the combustion gas flows may be formed between the housing and the first pipe.

The housing may be provided with at least one discharging port for discharging the combustion gas flowing along the flow path.

The housing may be made from a thermally insulating material.

The heat source may be provided with a torch connected to a first end of the second pipe and igniting and burning the fuel together with the air.

The heat source may be provided with a first injection port formed on the torch to inject the fuel and air into the second pipe and a first discharging port formed on a second end of the second pipe to discharge the combustion gas to a space defined between the first pipe and the housing.

The heat source may be configured to generate the thermal energy through an oxidation reaction of the fuel and air by an oxidizing catalyst filled in the second pipe.

The heat source may be provided with a first injection port formed on a first end of the second pipe to inject the fuel and air into the second pipe and a first discharging port formed on a second end of the second pipe to discharge the combustion gas to a space defined between the first pipe and the housing.

The reforming reaction unit may be provided with a second injection port formed on a first end of the first pipe to inject the fuel into a space defined between the first and second pipes and a second discharging port formed on a second end of the first pipe to discharge the reformed gas.

In another exemplary embodiment of the present invention, a fuel reforming apparatus is constructed with a heat source adapted to generate thermal energy, a reforming reaction unit adapted to generate a reformed gas containing hydrogen through a reforming reaction of the fuel using the thermal energy, a main thermal insulation member enclosing the heat source and reforming reaction unit to prevent the thermal energy generated from the heat source from being dissipated to an external side, and an auxiliary thermal insulation member installed on a local portion of the main thermal insulation member, which locally contacts a combustion gas generated from the heat source.

The main thermal insulation member may be provided in the form of a housing.

The auxiliary thermal insulation member may be provided with at least one thermal insulation plate attached on the local portion of the main thermal insulation member.

The main thermal insulation member and the auxiliary thermal insulation member may be made from a material selected from the group consisting of stainless steel, zirconium, aluminum, and ceramic.

The main thermal insulation member may be provided with a receiving portion formed near the local portion and the auxiliary thermal insulation member is made from a thermally insulating material filled in the receiving portion.

The thermally insulating material may be a glass fiber.

In still another exemplary embodiment of the present invention, a fuel reforming apparatus is constructed with a main body comprising a first pipe and a second pipe disposed in the first pipe, a heat source installed in the second pipe and adapted to generate thermal energy in the second pipe, a reforming reaction unit formed by filling a reforming catalyst in a space defined between the first and second pipes and adapted to generate a reformed gas containing hydrogen through a reforming reaction of the fuel, a main thermal insulation member enclosing the main body to allow a combustion gas generated from the heat source to flow along an outer circumference of the reforming reaction unit, and an auxiliary thermal insulation member installed on a local portion of the main thermal insulation member, which contacts locally a combustion gas generated from the heat source.

The main thermal insulation member may be provided in the form of a housing having a cross section area greater than that of the first pipe and a flow path is formed between the first pipe and the housing.

The auxiliary thermal insulation member may be provided with at least one thermal insulation plate attached on the local portion of the main thermal insulation member.

The main thermal insulation member may be provided with a receiving portion formed near the local portion and the auxiliary thermal insulation member is made from a thermally insulating material filled in the receiving portion.

The heat source may be provided with a torch connected to a first end of the second pipe and igniting and burning the fuel together with the air in the second pipe, a first injection port formed on the torch to inject the fuel and air into the second pipe, and a first discharging port formed on a second end of the second pipe to discharge the combustion gas to a space defined between the first pipe and the housing.

The auxiliary thermal insulation member may be provided with at least one thermal insulation plate attached on an inner wall of the main thermal insulation member, which corresponds to the first discharging port.

The main thermal insulation member may be provided with a receiving portion formed to correspond to the first discharging port and the auxiliary thermal insulation member is made from a thermally insulating material filling the receiving portion.

The heat source may be configured to generate the thermal energy through an oxidation reaction of the fuel and air by an oxidizing catalyst filling in the second pipe.

The heat source may be provided with a first injection port formed on a first end of the second pipe to inject the fuel and air into the second pipe and a first discharging port formed on a second end of the second pipe to discharge the combustion gas to a space defined between the first pipe and the housing.

The reforming reaction unit be provided with a second injection port formed on a first end of the first pipe to inject the fuel into a space defined between the first and second pipes and a second discharging port formed on a second end of the first pipe to discharge the reformed gas.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF INVENTION

The present invention will now be described more fully with reference to the accompanying drawings, in which exemplary embodiments of the invention are shown. The invention may, however, be embodied in many different forms and should not be construed as being limited to the embodiments set forth herein; rather these embodiments are provided so that this disclosure will be thorough and complete, and will fully convey the concept of the invention to those skilled in the art. Wherever possible, the same reference numbers will be used throughout the drawings to refer to the same or like parts.

Figure 1:
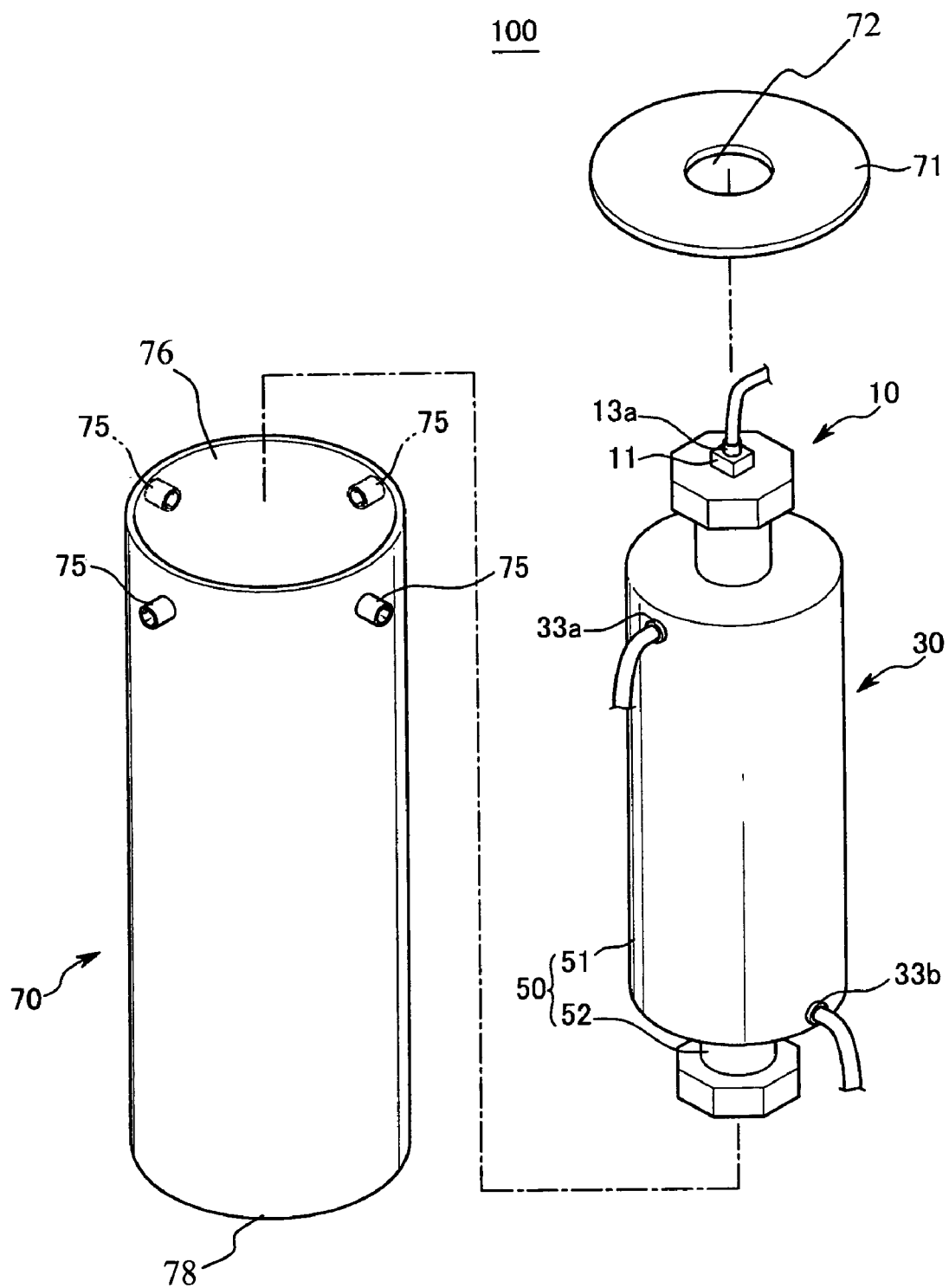
FIG. 1 is an assembly drawing of a fuel reforming apparatus constructed as an embodiment according to the principles of the present invention.
Figure 2:
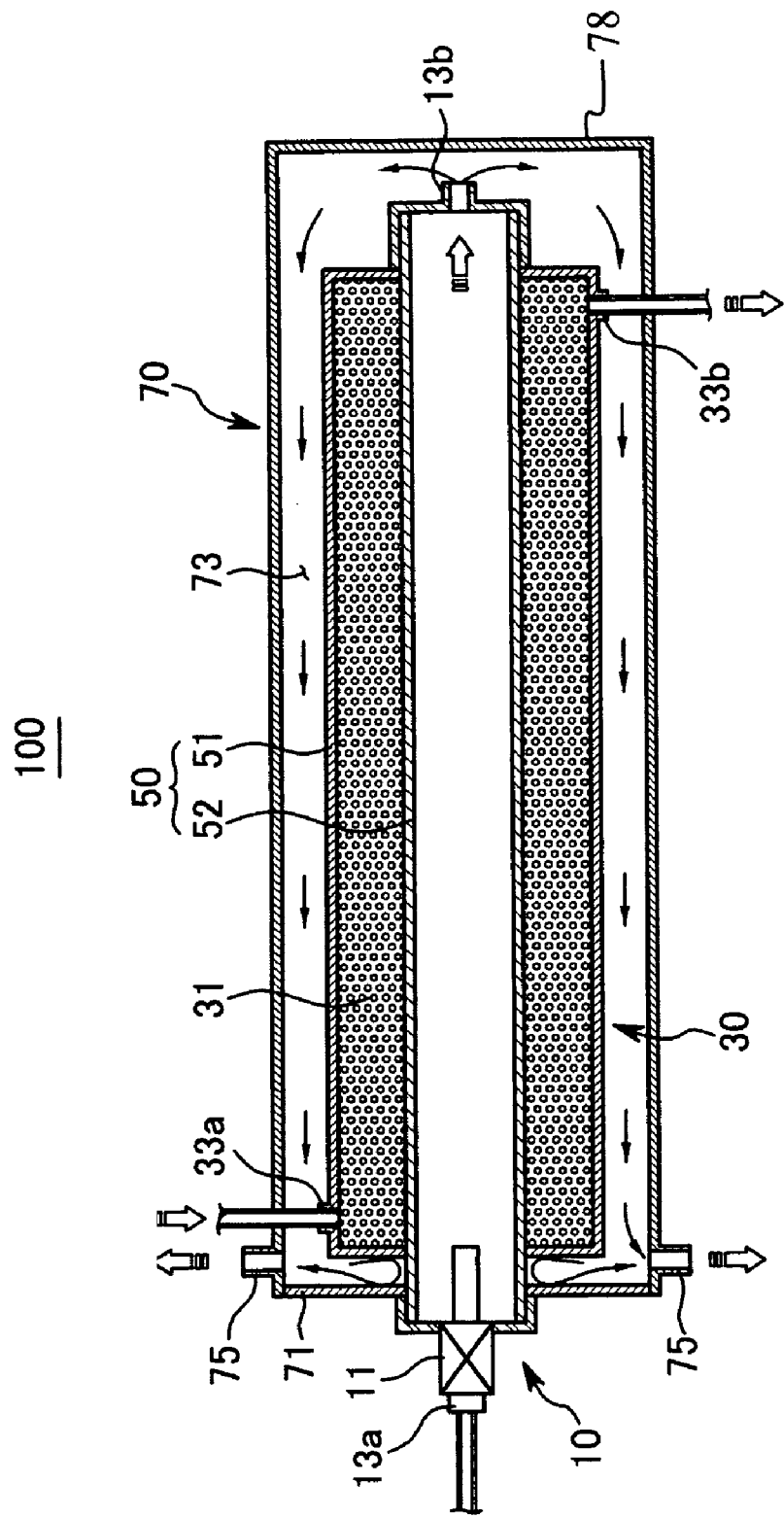
FIG. 2 is a cross-sectional view of the fuel reforming apparatus of FIG. 1, when the fuel reforming apparatus is assembled.

FIG. 1 is an assembly drawing of a fuel reforming apparatus constructed as an embodiment according to the principles of the present invention and FIG. 2 is a cross-sectional view of the fuel reforming apparatus of FIG. 1, when the fuel reforming apparatus is assembled.

Referring to FIGS. 1 and 2, a fuel reforming apparatus 100 as an embodiment according to the principles of the present invention is configured to generate a reformed gas containing hydrogen by combustion reaction of a fuel together with an oxidizing gas to generate thermal energy and performing a reforming reaction of the gaseous fuel using the thermal energy.

Fuel reforming apparatus 100 is used for a polymer electrolyte membrane fuel cell system that generates electrical energy through an oxidation reaction of the reformed gas and a reduction reaction of an oxidizing gas. Therefore, the reformed gas generated from fuel reforming apparatus 100 is supplied to a stack of the polymer electrolyte membrane fuel cell system.

The fuel used in fuel reforming apparatus 100 may be a liquid fuel containing hydrogen, such as methanol, ethanol, liquid petroleum gas (LPG), liquid natural gas (LNG) or gasoline, or a gaseous fuel containing hydrogen.

In addition, oxygen stored in a storage unit or ambient air containing oxygen may be used as the oxidizing gas. In the present embodiment, the case where ambient air containing the oxygen is used as oxidizing gas is exampled.

Fuel reforming apparatus 100 is constructed with a heat source 10 for generating thermal energy by combustion reaction of the fuel together with atmospheric air and a reforming reaction unit 30 for generating a reformed gas containing hydrogen through a reforming reaction of the fuel using the thermal energy generated by heat source 10.

Fuel reforming apparatus 100 is also constructed with a main body 50 having a concentric dual-pipe structure. That is, main body 50 includes a first pipe 51 and a second pipe 52 disposed inside first pipe 51.

First pipe 51 is cylindrical having opposite ends that are closed and a cross sectional area. Second pipe 52 is also cylindrical having a cross sectional area smaller than that of first pipe 51 and opposite ends that are closed. First and second pipes 51 and 52 are coaxially disposed so that an outer circumference of second pipe 52 is spaced apart from an inner circumference of first pipe 51 by an interval.

In fuel reforming apparatus 100, heat source 10 functions to burn the fuel and supply the thermal energy generated by combustion reaction of the fuel to reforming reaction unit 30. Heat source 10 is constructed with a torch 11 connected to a first end of second pipe 52. Torch 11 functions to ignite the gaseous fuel together with the air in second pipe 52.

Torch 11 is constructed with an ignition plug (not shown) for igniting the gaseous fuel and the atmospheric air. Torch 11 is also constructed with a first injection port 13a for injecting the fuel and the atmospheric air into second pipe 52.

In addition, in heat source 10, a first discharging port 13b for discharging combustion gas generated during the combustion reaction of the fuel and air in second pipe 52 is formed on a second end of second pipe 52.

In the present embodiment, reforming reaction unit 30 is constructed by filling the space between the first and second pipes 51 and 52 with a reforming catalyst 31, and accordingly, the reformed gas containing hydrogen is generated through a reforming reaction of the gaseous fuel using reforming catalyst 31.

Reforming catalyst 31 may contain a pellet-type carrier made from alumina ($Al_2O_3$), silica ($SiO_2$), or titania ($TiO_2$) and a catalytic material such as copper (Cu), nickel (Ni), or platinum (Pt) that is supported in the pellet-type carrier.

In addition, a third injection port 33a for injecting the fuel into the space between the first and second pipes 51 and 52 is formed on a first end of first pipe 51. A second discharging port 33b for discharging the reformed gas generated in the space between first and second pipes 51 and 52 through the reforming reaction between the fuel and reforming catalyst 31 is formed on a second end of first pipe 51.

Fuel reforming apparatus 100 is constructed with a housing 70 enclosing main body 50. Housing 70 allows a relatively high temperature combustion gas discharged through first discharging port 13b of heat source 10 to flow along an outer circumference of reforming reaction unit 30. That is, housing 70 functions to additionally supply the thermal energy of the combustion gas to reforming reaction unit 30.

In addition, housing 70 also functions as a thermal insulation case that can prevent the thermal energy acting on main body 50 from being dissipated to an external side.

Housing 70 is formed in a cylindrical pipe-shape providing an internal space for receiving main body 50. Housing 70 has a first end 76 that is opened and a second end 78 that is closed.

Housing 70 is constructed with a sealing cap 71 for sealing the opening first end 76. At this point, sealing cap 71 is formed in a flat donut-shaped disk so that one end of main body 50 received in housing 70 can protrude out of housing 70 through central hole 72 of sealing cap 71.

Here, housing 70 is coaxially disposed around first pipe 51 such that an outer circumference of first pipe 51 is spaced apart from an inner circumference of housing 70. That is, the cross section area of housing 70 is greater than that of first pipe 51.

Therefore, a flow path 73 along which the combustion gas discharged through first discharging port 13b of the heat source 10 can flow while contacting the outer circumference of reforming reaction unit 30 is defined between housing 70 and reforming reaction unit 30.

At this point, in order to prevent the thermal energy, which is generated by heat source 10 and acts on main body 50, from being dissipated through housing 70, housing 70 maybe made from a metallic thermally insulating material such as stainless steel, zirconium, or aluminum or a non-metallic thermally insulating material such as ceramic.

Furthermore, housing 70 is provided near the first end that is open with one or more discharging ports 75 for discharging the combustion gas circulating along flow path 73. Four discharging ports 75 may be formed at a portion near first end of the housing 70 and spaced apart from each at an interval of 90°.

The operation of the above-described fuel reforming apparatus constructed as the present embodiment according to the principles of the present invention will now be described in detail.

First, the fuel and atmospheric air are supplied into second pipe 52 through first injection port 13a of torch 11.

In this state, when the ignition plug (not shown) is operated, the fuel and air are sprayed into second pipe 52 and ignited by the ignition plug in heat source 10. Then, the fuel and air are burned to generate thermal energy in second pipe 52.

At this point, since reforming reaction unit 30 is formed at an external side of heat source 10, the thermal energy is supplied to reforming catalyst 31 of reforming reacting unit 30 through second pipe 52.

During the above-procedure, the relatively high temperature combustion gas generated by the combustion reaction of the fuel and air in second pipe 52 is discharged through first discharging port 13b of heat source 10.

Then, as indicated by arrows in FIG. 2, the combustion gas circulates along flow path 73 defined between first pipe 51 and housing 70 while contacting the outer circumference of reforming reaction unit 30. As a result, the thermal energy of the combustion gas is additionally applied to reforming reaction unit 30.

Accordingly, since reforming reaction unit 30 receives the thermal energy of the combustion gas as well as the thermal energy directly supplied from heat source 10, reforming reaction unit 30 can maintain a uniform temperature distribution within a reaction start temperature range required for the reforming reaction throughout the entire region of reforming reaction unit 30. At this point, the combustion gas circulating along flow path 73 is discharged to the external side through discharging ports 75 of housing 70.

In this state, the fuel is supplied to a space defined between first and second pipes 51 and 52 through third injection port 33a of reforming reaction unit 30. Then, the reforming reaction of the fuel is processed by reforming catalyst 31 in reforming reaction unit 30, thereby generating the reformed gas.

At this point, the reformed gas is discharged through the second discharging port 33b of reforming reaction unit 30 and then supplied to the stack of the polymer electrolyte membrane fuel cell system. An oxidation reaction of hydrogen contained in the reformed gas and a reduction reaction of the separately supplied atmospheric air are performed in the stack to output electric energy.

Figure 3:
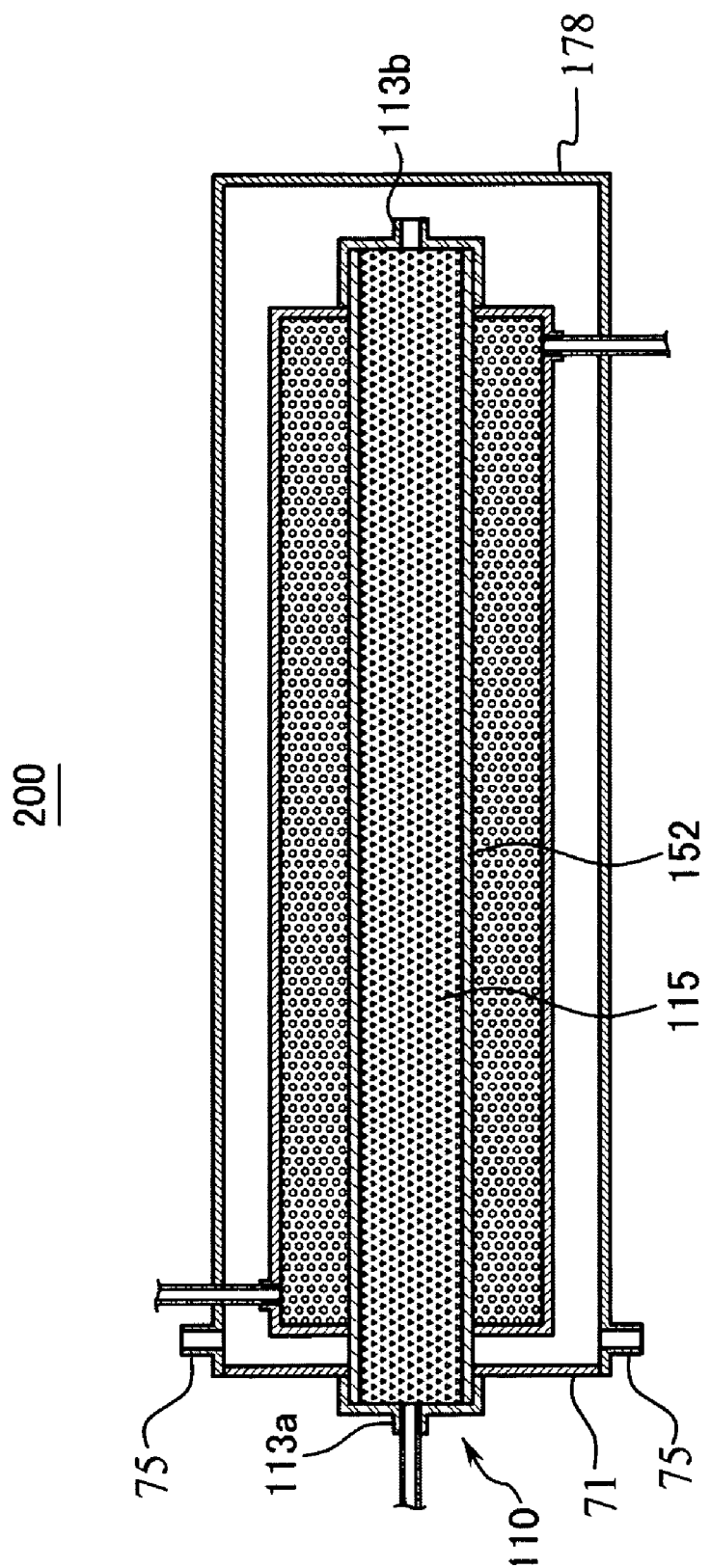
FIG. 3 is a cross-sectional view of a modified example of the fuel reforming apparatus of FIG. 1.

FIG. 3 is a cross-sectional view of a modified example of the fuel reforming apparatus of FIG. 1.

Referring to FIG. 3, a fuel reforming apparatus 200 of this modified example is identical to that of the foregoing embodiment of FIG. 2 except that a heat source 110 is formed by filling an oxidizing catalyst 115 in a second pipe 152.

That is, heat source 110 is configured to generate the thermal energy through an oxidation reaction between oxidizing catalyst 115 and the fuel and atmospheric air. Therefore, in heat source 110, second pipe 152 is provided at a first end with a first injection port 113a through which the fuel and air are injected into second pipe 152. Second pipe 152 is further provided at a second end with a first discharging port 113b through which the combustion gas generated during the combustion reaction of the fuel and air by oxidizing catalyst 115 is discharged.

Oxidizing catalyst 115 may contain a pellet-type carrier made from alumina ($Al_2O_3$), silica ($SiO_2$), or titania ($TiO_2$) and a catalytic material such as platinum (Pt) or ruthenium (Ru) that is supported on the pellet-type carrier.

When fuel reforming apparatus 200 is operated, the fuel and atmospheric air are supplied into second pipe 152 through first injection port 113a of heat source 110. Then, the thermal energy is generated in heat source 110 through the oxidation reaction of the fuel and atmospheric air by oxidizing catalyst 115. In addition, the combustion gas generated during the combustion reaction of the fuel and atmospheric air by oxidizing catalyst 115 is discharged through first discharging port 113b of heat source 110.

Since other parts of fuel reforming apparatus 200 according to this modified example and the operation thereof are identical to those of the foregoing embodiment of FIG. 2, the detailed description of fuel reforming apparatus 200 will be omitted herein.

Figure 4:
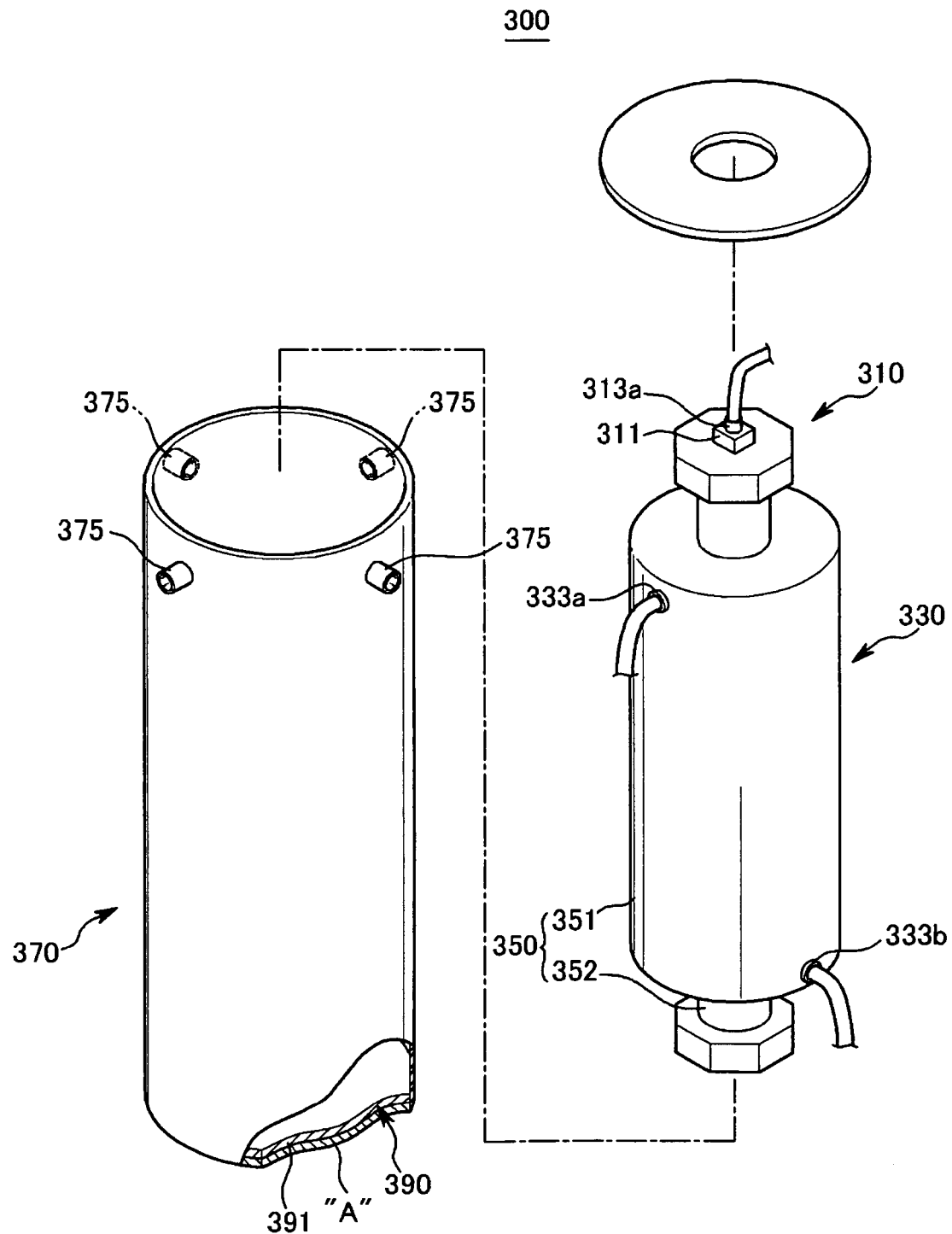
FIG. 4 is an assembly drawing of a fuel reforming apparatus constructed as another embodiment according to the principles of the present invention.
Figure 5:
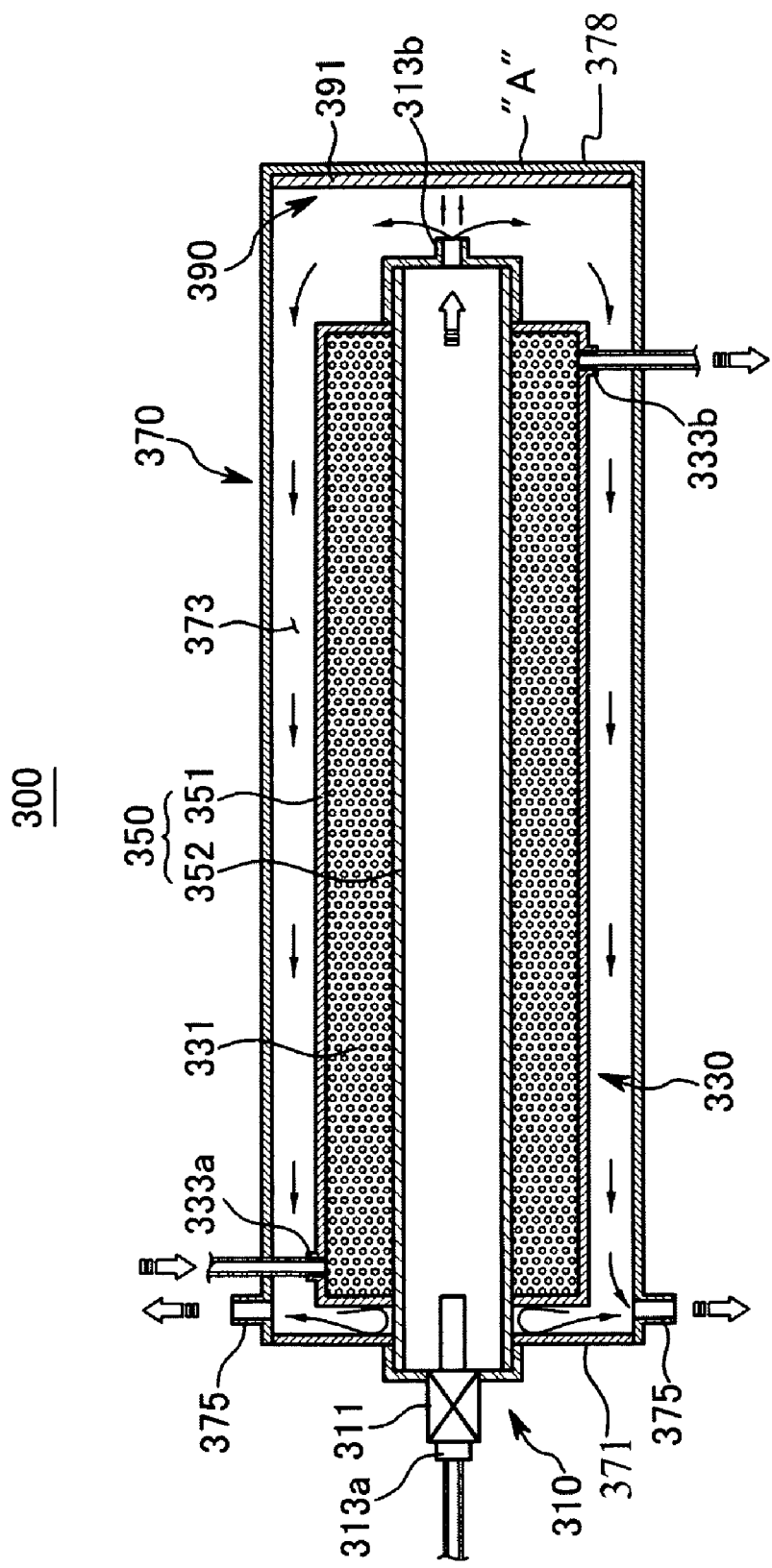
FIG. 5 is a cross-sectional view of the fuel reforming apparatus of FIG. 4, when the fuel reforming apparatus is assembled.

FIG. 4 is an assembly drawing of a fuel reforming apparatus according to another embodiment of the present invention and FIG. 5 is a sectional view of the fuel reforming apparatus of FIG. 4, when the fuel reforming apparatus is assembled.

Since a basic structure of the fuel reforming apparatus of this embodiment is identical to that of the foregoing embodiment of FIGS. 1 and 2, only the different structure and operation from those of the foregoing embodiment will be described in the following description.

In a fuel reforming apparatus 300 of this embodiment, a housing 370 serves as a heat insulation case for preventing the thermal energy applied from a heat source 310 to a main body 350 from being dissipated to the external side. For convenience, housing 370 will be referred to as "main thermal insulation member."

The combustion gas generated during the combustion reaction of the fuel in heat source 310 is discharged through a first discharging port 313b of heat source 310 and then circulated along a flow path 373 defined between first pipe 351 and main thermal insulation member 370.

During the above procedure, since the combustion gas discharged through first discharging port 313b of heat source 310 locally contacts an end (a portion A in FIGS. 4 and 5) of main thermal insulation member 370, which corresponds to first discharging port 313b, a temperature of the portion A increases locally and thus the thermal energy is dissipated through the portion A. As a result, the overall thermal insulation performance of fuel reforming apparatus 300 deteriorates.

Therefore, in this embodiment, an auxiliary thermal insulation member 390 is provided on portion A of main auxiliary insulation member 370. Auxiliary thermal insulation member 390 prevents the thermal energy of the combustion gas from being locally discharged through portion A.

Auxiliary thermal insulation member 390 is constructed with a thermal insulation plate 391 attached on an inner wall of the end (portion A) of main thermal insulation member 370. Thermal insulation plate 391 is formed in a shape corresponding to that of the portion A and made from a material identical to that of main thermal insulation member 370.

That is, when main thermal insulation member 370 is formed in a cylindrical shape having a circular section, thermal insulation plate 391 is formed in a disk-shape corresponding to a shape of the end of main thermal insulation member 370.

Referring to FIGS. 4 and 5, although only one thermal insulation plate 391 is provided on portion A, the present invention is not limited thereto. For example, a plurality of thermal insulation plates 391 may be installed on portion A.

When main thermal insulation member 370 is made from a metallic thermally insulating material, thermal insulation plate 391 is attached on portion A through a welding process. When main thermal insulation member 370 is made from a non-metallic thermally insulating material, thermal insulation plate 391 may be attached on portion A by an adhesive substance.

The operation of fuel reforming apparatus 300 constructed as this embodiment will now be described in detail.

First, the fuel and atmospheric air are supplied into second pipe 352 through first injection port 313a of torch 311.

In this state, when the ignition plug (not shown) is operated, the fuel and atmospheric air are sprayed into second pipe 352 and ignited by the ignition plug in heat source 310. Then, the fuel and atmospheric air are burned to generate the thermal energy in second pipe 352.

At this point, since reforming reaction unit 330 is formed at an external side of heat source 310, the thermal energy is supplied to reforming catalyst 331 of reforming reacting unit 330 through second pipe 352.

During the above-procedure, the relatively high temperature combustion gas generated by the combustion reaction of the fuel and atmospheric air in second pipe 352 is discharged through first discharging port 313b of heat source 310.

Then, as indicated by arrows in FIG. 5, the combustion gas circulates along the flow path 373 defined between first pipe 351 and main insulation member 370 while contacting the outer circumference of reforming reaction unit 330. As a result, the thermal energy of the combustion gas is additionally applied to reforming reaction unit 330.

Accordingly, since reforming reaction unit 330 receives the thermal energy of the combustion gas as well as the thermal energy directly supplied from heat source 310, reforming reaction unit 330 can maintain a uniform temperature distribution within a reaction start temperature range required for the reforming reaction throughout the entire region of reforming reaction unit 330. At this point, the combustion gas circulating along flow path 373 is discharged to the external side through discharging port 375 of main thermal insulation member 370.

The thermal energy applied to reforming reaction unit 330 and flow path 373 by heat source 310 is not dissipated to the external side by main thermal insulation member 370.

During the above procedure, the high temperature combustion gas generated from heat source 310 is locally directed to the end (portion A) of main thermal insulation member 370 through first discharging port 313b. At this point, since thermal insulation plate 391 is installed on portion A of main thermal insulation member 370, dissipation of the thermal energy of the combustion gas locally acting on portion A of main thermal insulation member 370 through the portion A can be prevented by thermal insulation plate 391.

Therefore, the combustion gas maintains its thermal energy and circulates along flow path 373 defined between first pipe 351 and main thermal insulation member 370, thereby additionally applying the thermal energy to reforming reaction unit 330.

In this state, the fuel is supplied to a space defined between first and second pipes 351 and 352 through first injection port 333a of reforming reaction unit 330. Then, the reforming reaction of the fuel is processed by reforming catalyst 31 in reforming reaction unit 30, thereby generating the reformed gas containing the hydrogen.

At this point, the reformed gas is discharged through second discharging port 333b of reforming reaction unit 330 and then supplied to the stack of the polymer electrolyte membrane fuel cell system. An oxidation reaction of hydrogen contained in the reformed gas and a reduction reaction of the separately supplied atmospheric air are performed in the stack to output predetermined electric energy.

Figure 6:
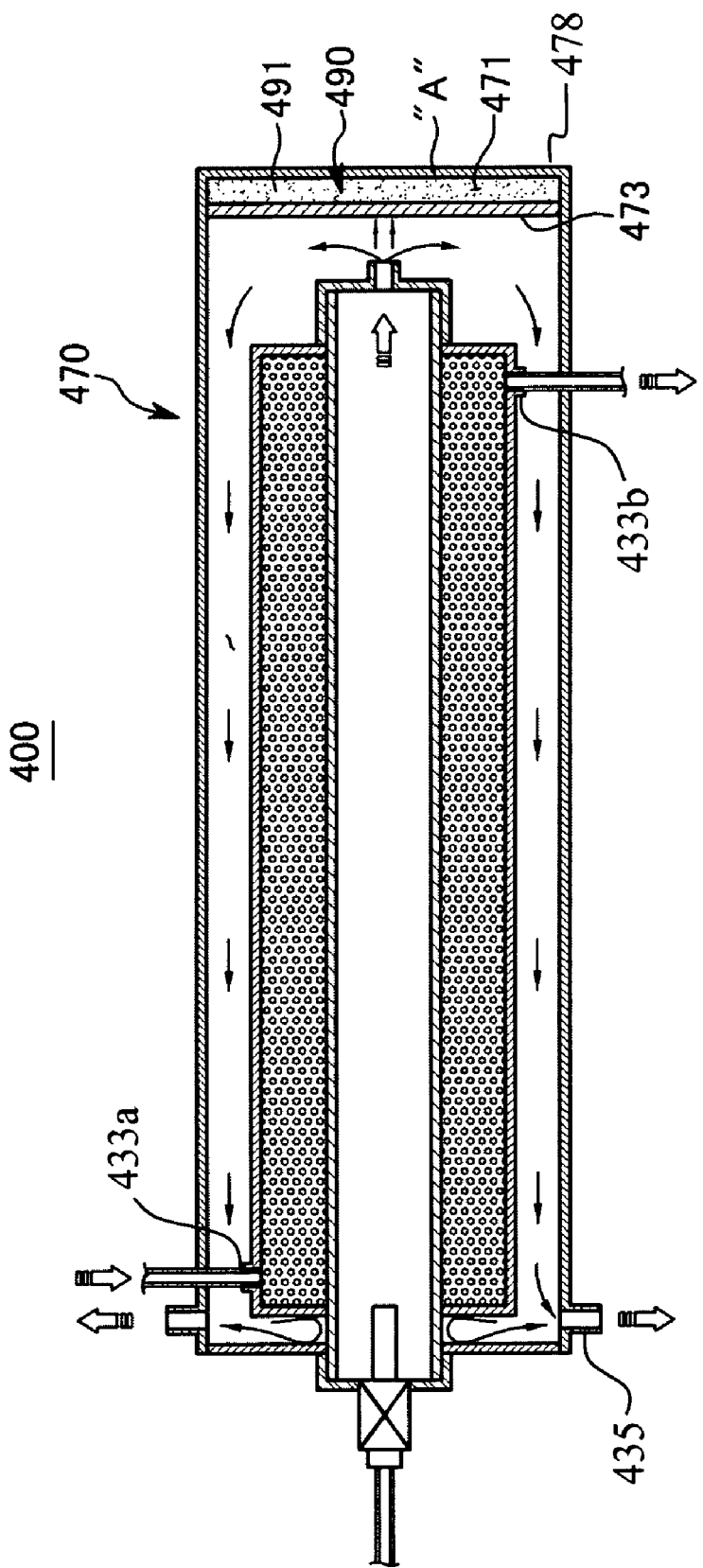
FIG. 6 is a cross-sectional view of a modified example of the fuel reforming apparatus of FIG. 5.

FIG. 6 is a cross-sectional view of a modified example of the fuel reforming apparatus of FIG. 5.

Referring to FIG. 6, in a fuel reforming apparatus 400 according to this modified example, an auxiliary thermal insulation member 490 is constructed with a thermally insulating material 491 that is buried near a portion A of a main thermal insulation member 470.

That is, a receiving space 471 is provided near portion A of main thermal insulation member 470 and filled with the thermally insulating material. Receiving space 471 is defined between an inner wall of portion A and a barrier 473 spaced apart from the inner wall of portion A. The thermally insulating material may be a glass fiber.

Since other parts of fuel reforming apparatus 400 according to this modified example and the operation thereof are identical to those of the foregoing embodiment of FIGS. 4 and 5, the detailed description thereof will be omitted herein.

Figure 7:
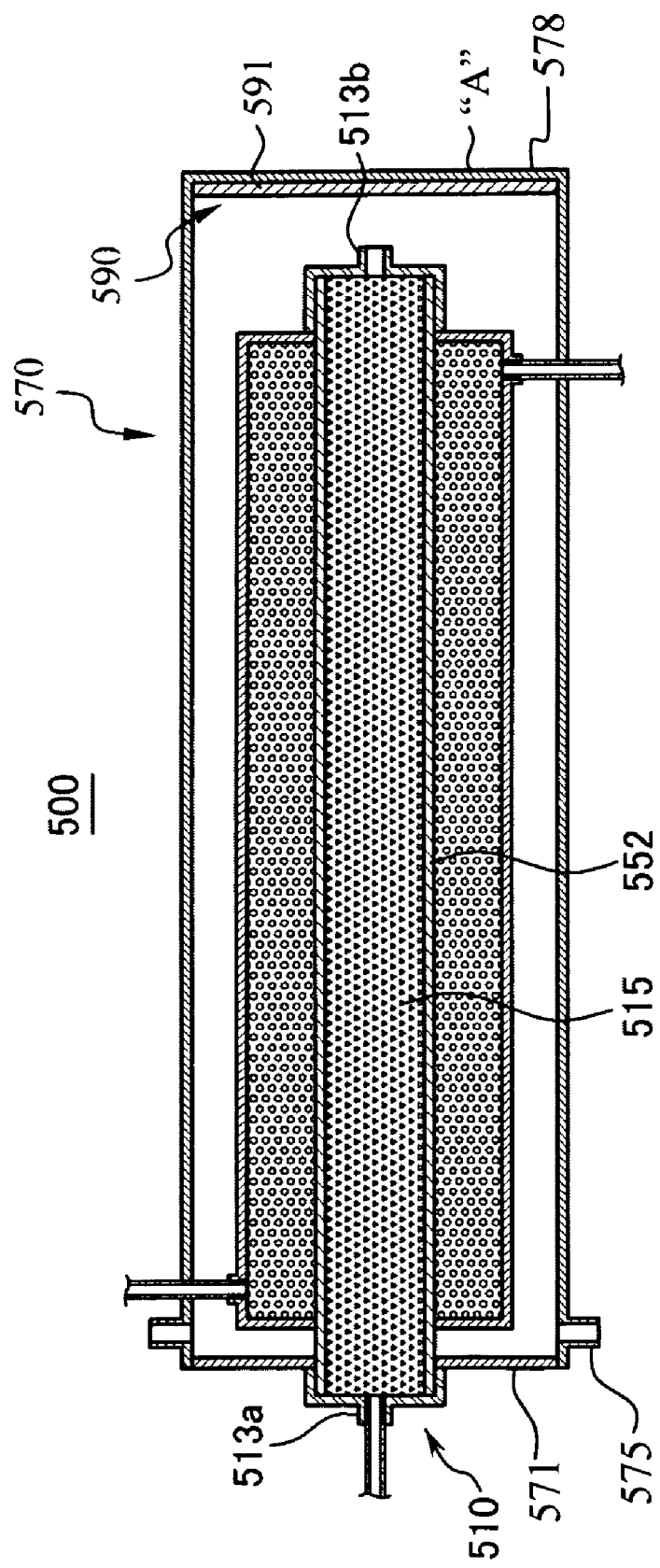
FIG. 7 is a cross-sectional view of another modified example of the fuel reforming apparatus of FIG. 5.
Figure 8:
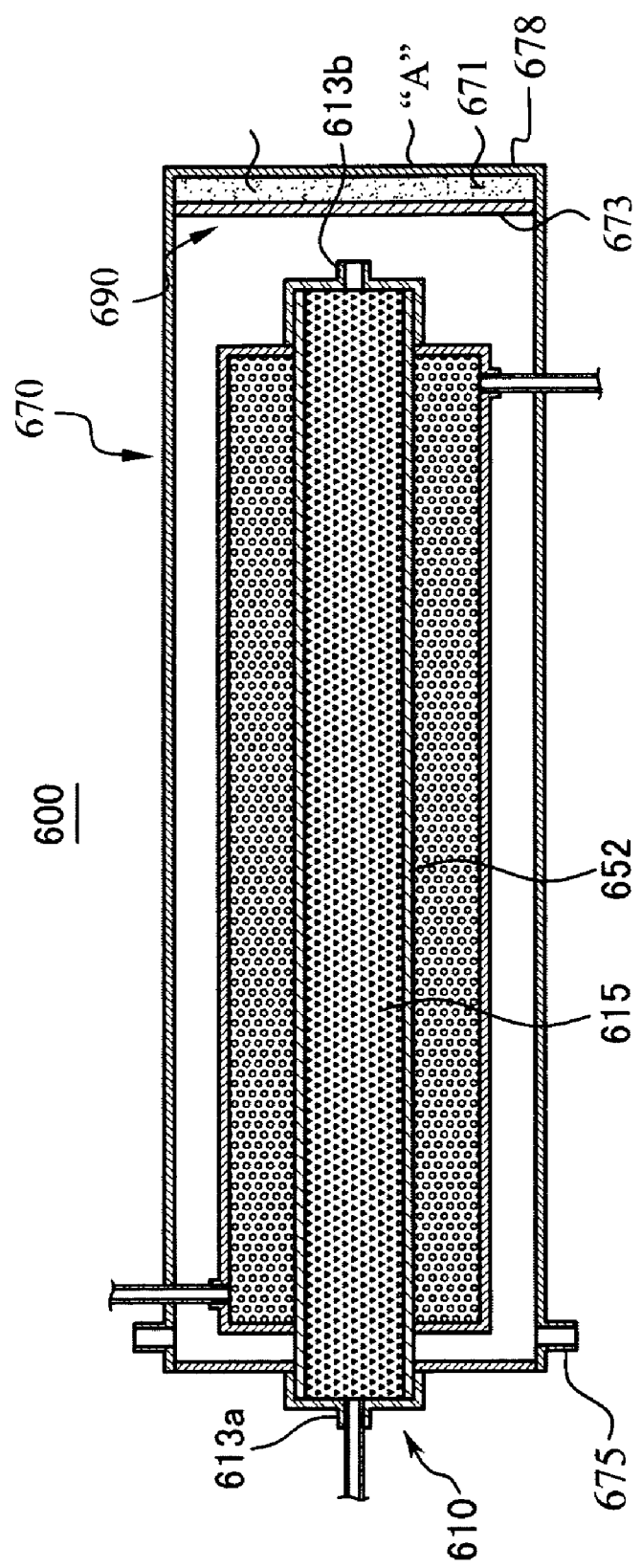
FIG. 8 is a cross-sectional view of another modified example of the fuel reforming apparatus of FIG. 5.

FIGS. 7 and 8 are cross-sectional views of other modified examples of the fuel reforming apparatus of FIG. 5.

Referring to FIGS. 7 and 8, in a fuel reforming apparatus 500, 600 according to these modified examples, an oxidizing catalyst 515, 615 fills a second pipe 552, 652 of a heat source 510, 610.

Heat source 510, 610 is configured to generate the thermal energy through the oxidation reaction of the fuel and atmospheric air by the oxidizing catalyst 515, 615.

In heat source 510, 610, a first injection port 513a, 613a for injecting the fuel and atmospheric air into second pipe 552, 652 is formed on a first end of second pipe 552, 652. A first discharging port 513b, 613b for discharging the combustion gas generated during the combustion reaction of the fuel and atmospheric air by oxidizing catalyst 515 and 615 is formed on a second end of second pipe 552, 652.

Oxidizing catalyst 515, 615 may contain a pellet-type carrier made from alumina ($Al_2O_3$), silica ($SiO_2$), or titania ($TiO_2$) and a catalytic material such as platinum (Pt) or ruthenium (Ru) that is supported in the pellet-type carrier.

Therefore, when fuel reforming apparatus 500, 600 is operated, the fuel and atmospheric air are supplied into second pipe 552, 652 through first injection port 513a, 613a of heat source 510, 610. Then, the thermal energy is generated in heat source 510, 610 through the oxidation reaction of the fuel and atmospheric air by oxidizing catalyst 515, 615. In addition, the combustion gas generated during the combustion reaction of the fuel and atmospheric air by oxidizing catalyst 515, 615 is discharged through first discharging port 513b, 613b of heat source 510, 610.

Referring to FIG. 7, auxiliary thermal insulation member 590 in fuel reforming apparatus 500 is constructed with a thermal insulation plate 591 attached on an inner wall of the end wall 578 (portion A) of main thermal insulation member 570. Thermal insulation plate 591 is formed in a shape corresponding to that of portion A and made from a material identical to that of main thermal insulation member 570.

That is, when main thermal insulation member 570 is formed in a cylindrical shape having a circular section, thermal insulation plate 591 is formed in a disk-shape corresponding to a shape of the end of main thermal insulation member 570.

Referring to FIG. 8, auxiliary thermal insulation member 690 in fuel reforming apparatus 600 is constructed with a thermally insulating material 691 that is buried near a portion A of main thermal insulation member 670.

That is, a receiving space 671 is provided near portion A of main thermal insulation member 670 and filled with the thermally insulating material. Receiving space 671 is defined between an inner wall of portion A and a barrier 673 spaced apart from the inner wall of portion A. The thermally insulating material may be a glass fiber.

Since other parts of fuel reforming apparatus 500, 600 according to this modified example and the operation thereof are identical to those of the foregoing embodiment of FIG. 2, the detailed description thereof will be omitted herein.

According to the present invention, since the fuel reforming apparatus further includes the housing enclosing the main body, the housing allows a relatively high temperature combustion gas discharged through the first discharging port of the heat source to flow along an outer circumference of the reforming reaction unit. As a result, the thermal energy of the combustion gas is additionally applied to the reforming reaction unit.

Accordingly, since the reforming reaction unit receives the thermal energy of the combustion gas as well as the thermal energy directly supplied from the heat source, it can maintain a uniform temperature distribution within a reaction start temperature range required for the reforming reaction throughout the entire region. As a result, the thermal efficiency and performance efficiency of the fuel cell system can be further improved.

Furthermore, since the auxiliary thermal insulation member is additional installed on a local portion of the main thermal insulation member, which locally contacts the combustion gas discharged from the heat source, the dissipation of the thermal energy to the external side through the local portion of the main thermal insulation member can be prevented, thereby reducing the thermal energy loss and preventing the main thermal insulation member from being locally damaged.

Although exemplary embodiments of the present invention have been described in detail hereinabove, it should be clearly understood that many variations and/or modifications of the basic inventive concept taught herein still fall within the spirit and scope of the present invention, as defined by the appended claims.

What is claimed is:

1. A fuel reforming apparatus, comprising:
    a main body comprising a first pipe and a second pipe disposed inside the first pipe;
    a heat source installed in the second pipe and adapted to generate thermal energy in the second pipe;
    the first pipe having opposite ends that are closed onto an outer circumference of the second pipe to define, with said outer circumference of the second pipe, a space that contains a reforming catalyst so as to provide a reforming reaction unit said reforming reaction unit being adapted to be heated by the heat source and generate a reformed gas containing hydrogen through a reforming reaction of the fuel;
    the second pipe having, at a first end, a first injection port for fuel to be consumed by the heat source and, at a second and opposite end, a first discharging port for discharging a combustion gas; and
    a housing encasing the main body and allowing the combustion gas generated from the heat source to flow along an outer circumference of the reforming reaction unit.

2. The fuel reforming apparatus of claim 1, comprised of defining a flow path, along which the combustion gas flows, between the housing and the first pipe.

3. The fuel reforming apparatus of claim 2, comprised of providing the housing with at least one discharging port for discharging the combustion gas flowing along the flow path.

4. The fuel reforming apparatus of claim 2, comprised of the housing being made from a thermally insulating material.

5. The fuel reforming apparatus of claim 1, comprised of the heat source comprising a torch connected to the first end of the second pipe and igniting and burning the fuel together with air.

6. The fuel reforming apparatus of claim 5, comprised of the heat source comprising:
    the first injection port formed on the torch to inject the fuel and air into the second pipe; and
    the first discharging port formed on the second end of the second pipe to discharge the combustion gas to a space defined between the first pipe and the housing.

7. The fuel reforming apparatus of claim 1, comprised of configuring the heat source to generate the thermal energy through an oxidation reaction of the fuel and air by an oxidizing catalyst filled in the second pipe.

8. The fuel reforming apparatus of claim 7, comprised of the heat source comprising:
    the first injection port formed on the first end of the second pipe to inject the fuel and air into the second pipe; and
    the first discharging port formed on the second end of the second pipe to discharge the combustion gas to a space defined between the first pipe and the housing.

9. The fuel reforming apparatus of claim 1, comprised of the reforming reaction unit comprising a second injection port formed on a first end of the first pipe to inject the fuel into the space defined between the first pipe and the outer circumference of the second pipe and a second discharging port formed on a second end of the first pipe to discharge the reformed gas.

10. A fuel reforming apparatus, comprising:
    a main body comprising a first pipe and a second pipe disposed in the first pipe;
    a heat source installed in the second pipe and adapted to generate thermal energy in the second pipe;
    the first pipe having opposite ends that are closed onto an outer circumference of the second pipe to define, with said outer circumference of the second pipe, a space that contains a reforming catalyst so as to provide a reforming reaction unit, said reforming reaction unit being adapted to be heated by the heat source and generate a reformed gas containing hydrogen through a reforming reaction of the fuel;
    the second pine having, at a first end, a first injection port for fuel to be consumed by the heat source and, at a second and opposite end, a first discharging port for discharging a combustion gas;
    a main thermal insulation member enclosing the main body to allow the combustion gas generated from the heat source to flow along an outer circumference of the reforming reaction unit; and
    an auxiliary thermal insulation member installed on a local portion of the main thermal insulation member, which contacts locally a combustion gas generated from the heat source.

11. The fuel reforming apparatus of claim 10, comprised of providing the main thermal insulation member in the form of a housing having a cross section area greater than that of the first pipe and a flow path is formed between the first pipe and the housing.

12. The fuel reforming apparatus of claim 11, comprised of the auxiliary thermal insulation member comprising at least one thermal insulation plate attached on the local portion of the main thermal insulation member.

13. The fuel reforming apparatus of claim 10, comprised of the main thermal insulation member comprising a receiving portion formed near the local portion and the auxiliary thermal insulation member is made from a thermally insulating material filled in the receiving portion.

14. The fuel reforming apparatus of claim 10, comprised of the heat source comprising:
    a torch connected to the first end of the second pipe and igniting and burning the fuel together with air in the second pipe;
    the first injection port formed on the torch to inject the fuel and air into the second pipe; and
    the first discharging port formed on the second end of the second pipe to discharge the combustion gas to a space defined between the first pipe and the housing.

15. The fuel reforming apparatus of claim 14, comprised of the auxiliary thermal insulation member comprising at least one thermal insulation plate attached on an inner wall of the main thermal insulation member, which corresponds to the first discharging port.

16. The fuel reforming apparatus of claim 14, comprised of the main thermal insulation member comprising a receiving portion formed to correspond to the first discharging port and the auxiliary thermal insulation member being made from a thermally insulating material filled in the receiving portion.

17. The fuel reforming apparatus of claim 10, comprised of configuring the heat source to generate the thermal energy though an oxidation reaction of the fuel and air by an oxidizing catalyst filled in the second pipe.

18. The fuel reforming apparatus of claim 17, comprising of heat source comprising:
    the first injection port formed on the first end of the second pipe to inject the fuel and air into the second pipe; and
    the first discharging port formed on the second end of the second pipe to discharge the combustion gas to a space defined between the first pipe and the housing.

19. The fuel reforming apparatus of claim 10, comprised of the reforming reaction unit comprising:
    a second injection port formed on a first end of the first pipe to inject the fuel into the space defined between the first pipe and the outer circumference of the second pipe; and
    a second discharging port formed on a second end of the first pipe to discharge the reformed gas.

* * * * *